United States Patent
Phogat et al.

(10) Patent No.: US 10,242,464 B1
(45) Date of Patent: Mar. 26, 2019

(54) DIFFUSION COLORING USING WEIGHTED COLOR POINTS

(71) Applicant: Adobe Systems Incorporated, San Jose, CA (US)

(72) Inventors: Ankit Phogat, Noida (IN); Vineet Batra, Pritam Pura (IN); Mridul Kavidayal, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 15/707,212

(22) Filed: Sep. 18, 2017

(51) Int. Cl.
    *G06T 11/00*     (2006.01)
    *G06T 9/20*     (2006.01)
    *G06T 11/20*     (2006.01)

(52) U.S. Cl.
    CPC ............ *G06T 11/001* (2013.01); *G06T 9/20* (2013.01); *G06T 11/203* (2013.01); *G06T 2200/24* (2013.01)

(58) Field of Classification Search
    CPC ........ G06T 11/001; G06T 9/20; G06T 11/203
    See application file for complete search history.

(56) References Cited

U.S. PATENT DOCUMENTS

2012/0320063 A1* 12/2012 Finch ................. G06T 11/203
    345/442
2013/0127856 A1* 5/2013 Winnemoeller ........ G06T 17/20
    345/423

OTHER PUBLICATIONS

"Mesh Colors" Yuksel et al. ACM Transactions on Graphics, vol. 29, No. 2, Article 15, Publication date: Apr. 2010.*
Jacobson, Alec, et al., "Bounded Biharmonic Weights for Real-Time Deformation", SIGGRAPH '11, ACM Transactions on Graphics—Proceedings of ACM SIGGRAPH, Artilce No. 78, vol. 30, Issue 4, Jul. 2011, 8 pages.
Orzan, Alexandrina, et al., "Diffusion Curves: A Vector Representation for Smooth-Shaded Images", SIGGRAPH '08, ACM Transactions on Graphics, vol. 27, Apr. 2008, 8 pages.

* cited by examiner

*Primary Examiner* — Antonio A Caschera
(74) *Attorney, Agent, or Firm* — Kilpatrick Townsend & Stockton LLP

(57) ABSTRACT

An automated process provides diffusion coloring of vector graphics using color points, which appear to the user as color handles. A computing device programmatically receives input from a user establishing a plurality of color handles within a source geometry specified by a set of curves. The computing device defines a mesh with a plurality of vertices distributed throughout the source geometry. A resultant color at each vertex of the plurality of vertices is determined and a diffused pixel color is programmatically set for each pixel within the source geometry by interpolating between the resultant colors at the plurality of vertices.

20 Claims, 7 Drawing Sheets
(4 of 7 Drawing Sheet(s) Filed in Color)

DIFFUSION COLORING USING WEIGHTED COLOR POINTS

TECHNICAL FIELD

This disclosure relates generally to the field of digital illustration. More specifically, this disclosure relates to processing techniques for adding smoothly shaded colors to and changing these colors of vector graphic illustrations of the type used in graphical design, such as for Web sites and print media.

BACKGROUND

Design software applications are a subclass of application software used for graphic design, multimedia development, specialized image development, image editing, or simply to access graphic files. Conventional design applications utilize either raster or vector graphic reading and editing methods to create, edit, and view digital media (e.g. animations, graphics, images, designs, media objects, etc.). Some conventional design applications, such as graphics programs, focus exclusively on either vector or raster graphics, but there are a few that combine them. Advantages of vector graphics include efficient storage of graphics data and easy scaling to accommodate a wide variety of resolutions across many different display devices and media types.

The geometry of vector graphics artwork can be defined by a set of cubic Bezier curves. Coloring of such artwork can be accomplished by fills and gradients. However, the coloring in such a case may be limited in complexity. Such gradients and fills are also uncoupled from the overall artwork geometry and often must be redone manually if a user alters the artwork geometry, limiting the creativity and expressiveness of the user.

More complex coloring can be made available by allowing the user to create diffusion curves. Diffusion curves are vector graphic primitives for creating smooth-shaded images. Each diffusion curve partitions the geometric space through which it is drawn, defining different colors on either side. When rendered, these colors then spread into the regions on both sides of the curve in a way analogous to diffusion. The colors may also be defined to vary smoothly along the curve and the sharpness of the color transition from one side of the curve to the other may also be specified. Even though diffusion curves offer a rich coloring model they are not intuitive to use, and it is difficult to control the color values at the time of creation. The use of diffusion curves necessitates color being computed for every pixel of the artwork whenever a change is made, which is computationally expensive.

SUMMARY

Certain embodiments for diffusion coloring using weighted color points involve programmatically receiving input from a user establishing a plurality of color handles within a source geometry specified by a set of curves. A plurality of vertices distributed throughout the source geometry are defined. A resultant color at each vertex of the plurality of vertices is determined by calculating a weighted sum of color values contributed by the plurality of color handles. A diffused pixel color is programmatically set for each pixel of a plurality of pixels within the source geometry by interpolating between the resultant colors at the plurality of vertices. A rendered geometry is programmatically produced, wherein the rendered geometry is specified by the set of curves and includes the diffused pixel color for each pixel.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Features, embodiments, and advantages of the present disclosure are better understood when the following Detailed Description is read with reference to the accompanying drawings, where.

DETAILED DESCRIPTION

Figure 1:
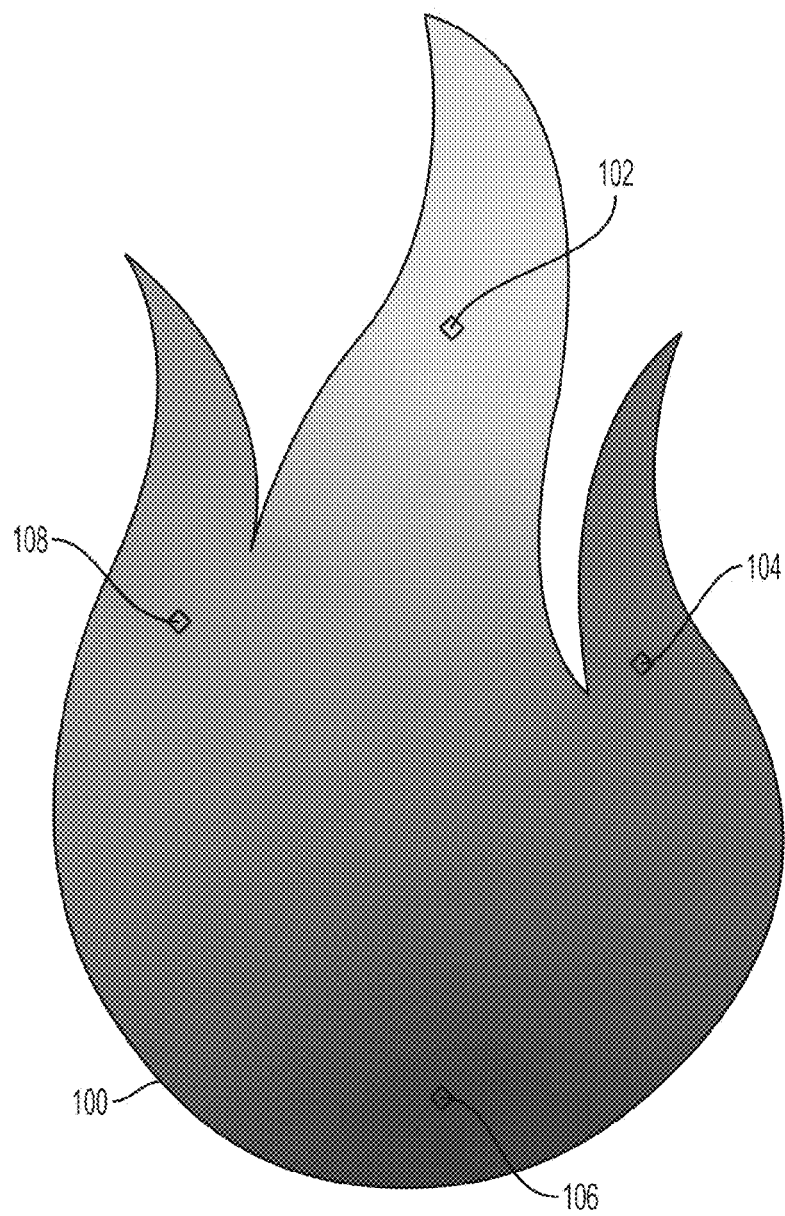
FIG. 1 depicts an example of artwork geometry with color handles and diffusion coloring resulting from the color handles, according to some embodiments.

As described above, the geometry of vector graphics artwork can be defined by a set of cubic Bezier curves. Coloring of such artwork can be accomplished by fills and gradients. However, the coloring in such a case may be limited in complexity. More complex coloring can be made available by allowing the user to create diffusion curves, which are not intuitive to use, and are computationally expensive.

Techniques are disclosed herein for diffusion coloring of vector graphics artwork using color points, which appear to the user as intuitive "color handles" and provide for diffusion coloring without performing complex calculations for the color of each pixel in the artwork. For example, a vector graphics illustration application receives user inputs that create or select a set of splines or curves (artwork) to color. The vector graphics illustration application defines, based on the splines or curves, a set of vertices that are distributed throughout the source geometry (i.e., the artwork being manipulated). The user selects the color to apply to the selected artwork. The user defines a color handle by applying the color anywhere inside the curve geometry, for example, by tapping or clicking anywhere inside the curve geometry to add a color point. The vector graphics illustration application accepts these user actions as inputs and produces diffusion coloring in response. The initial color point will color the entire artwork in accordance with the color selected. However, with each additional color handle added, the color from all existing color handles is automatically computed over the entire artwork and the colored artwork is presented to the user immediately or almost immediately. For instance, the vector graphics illustration application computes resultant color values for the set of vertices. These color values are computed from color values contributed by various color handles added to the artwork by the user. The vector graphics illustration application interpolates between the color values at the vertices to obtain diffused pixel colors for various pixels of the artwork. The vector graphics illustration application produces a rendered geometry having the diffused pixel colors. The rendered geometry includes all colors smoothly blended according to color handle weight defined by the user for each color handle, as well as locations of color handles within the rendered geometry.

After placing the color handles, the vector graphics illustration application allows the user to drag any existing color handle to a new position within the geometry of the shape, the resultant coloring is recomputed to reflect the new position of color point, and the rendered geometry is presented almost immediately. The user can select a new color for a color point, for example, by tapping or clicking on an existing color handle to change its color. The user can remove an existing color point, for example, by double clicking or double tapping on the color handle. If the user edits the geometry, the vector graphics illustration application recomputes the color over the new geometry and produces a new rendered geometry with smoothly blended, updated color.

The techniques disclosed herein provide a solution for rich and intuitive coloring of vector graphics. The color handles as described herein work in harmony with the traditional notion of shape coverage in vector graphics, leading to predictable and intuitive results. An easy user interface for the control of color of a rendered geometry is provided in which color is intrinsically bounded by the coverage of shapes. The output geometry is defined with the same curves as the source and is easy to edit. Further, with any modifications to the geometry of the shape, the color is automatically recomputed. The resultant coloring is shape aware, i.e., color is diffused in accordance with the underlying geometry and the geodesic distance of portions of the shape from each color handle. The techniques described herein strike a balance between the available computation power and the quality of the resultant art.

Throughout this disclosure, the term "color handle" refers to a graphical construct that appears on a presentation device that can be manipulated by a user. The term "color point" is used to refer the mathematical and parametric information stored in memory about the specific point in an artwork that a color handle manipulates. It should be noted that in some textual contexts, these terms could be interchanged without changing the meaning of the text. The terms "artwork," "geometry," and "artwork geometry" refer to a graphical image that has or is having color applied in a software application that implements an embodiment of the invention. The term "shape" can have the same meaning, but can also invoke reference to a specific outline of a graphical image. The adjective "source" refers to an artwork, geometry, or shape that is initially defined prior to adding diffused color, and the adjective "rendered" refers to the visually similar or identical artwork with diffused color added. Other terms have their ordinary and customary meaning in the art, or are defined when used, either implicitly or explicitly.

Referring now to the drawings, FIG. 1 presents an example artwork geometry 100 as shown on a computer system presentation device, with color handles 102, 104, 106, and 108, and with the diffusion coloring resulting from the color handles. The color shown at each color handle is the selected color for the color handle. In this particular example, each color handle is depicted as a rhombus, and the color inside the rhombus is the selected color. The top color handle 102 defines a yellow color point, the bottom color handle 106 defines a deep orange color point, and the color handles 104 and 108 on the sides of the "flame" define lighter orange color points, the colors assigned to which all blend together to give the shape realistic coloring. The colors from each color handle blend smoothly as the eye wanders between handles. The color points defined by the handles work in harmony with the traditional notion of shape coverage. As such, they lead to predictable and intuitive results; it is easy for user to control the output as it is intrinsically bounded by the coverage of the shape. If the color handles are moved, the blended appearance changes accordingly, as is also the case of the shape of the artwork is changed.

Figure 2:
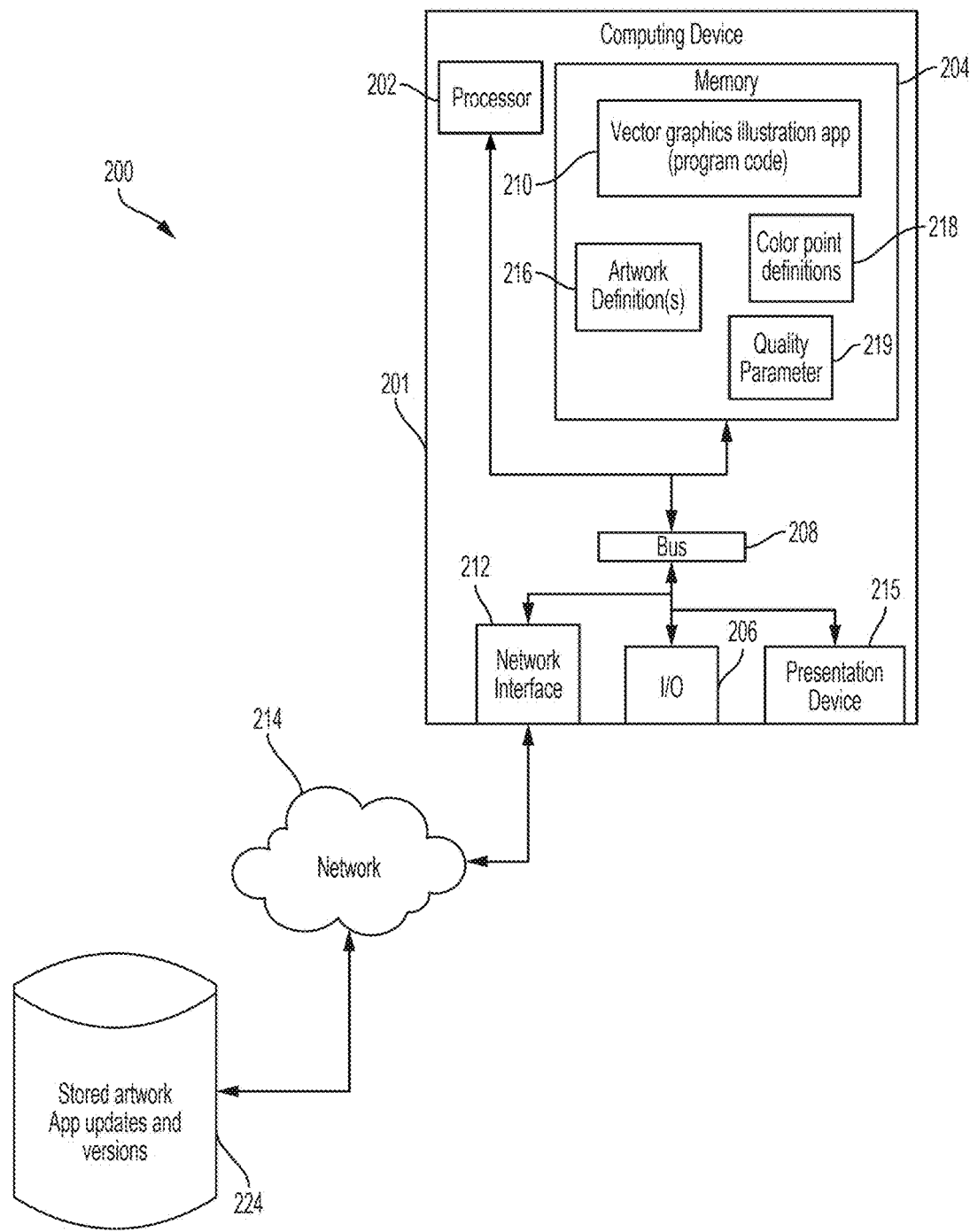
FIG. 2 is a diagram depicting an example of a system and computing environment in which diffusion coloring using weighted color points is practiced, according to certain embodiments.

Any suitable computing system or group of computing systems can be used for performing the operations described herein. For example, FIG. 2 depicts a system 200 that executes a vector graphics program with diffusion coloring using weighted color points. System 200 includes computing device 201, which in turn includes a processor 202 communicatively coupled to one or more memory devices 204. The processor 202 executes computer-executable program code stored in a memory device 204, accesses information stored in the memory device 204, or both. Examples of the processor 202 include a microprocessor, an application-specific integrated circuit ("ASIC"), a field-programmable gate array ("FPGA"), or any other suitable processing device. The processor 202 can include any number of processing devices, including a single processing device. The memory device 204 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

Still referring to FIG. 2, the system 200 may also include a number of external or internal devices, such as input or output devices. For example, the computing device 201 is shown with one or more input/output ("I/O") interfaces 206. An I/O interface 206 can receive input from input devices or provide output to output devices (not shown). One or more buses 208 are also included in the computing device 201. The bus 208 communicatively couples one or more components of a respective one of the computing device 201.

The processor 202 executes program code that configures the computing device 201 to perform one or more of the operations described herein. The program code includes, for example, vector graphics illustration application 210, or other suitable applications that perform one or more operations described herein. The program code may be resident in the memory device 204 or any suitable computer-readable medium and may be executed by the processor 202 or any other suitable processor. Memory device 204 may also be used to store artwork definition(s) 216, color point definitions 218, which are typically created using input from a user of the color handles described herein, and quality parameter(s) 219, which can either be default values or values set via input from the user.

The system 200 of FIG. 2 also includes a network interface device 212. The network interface device 212 includes any device or group of devices suitable for establishing a wired or wireless data connection to one or more data networks 214. Non-limiting examples of the network interface device 212 include an Ethernet network adapter, a modem, and/or the like. The system 200 is able to communicate with one or more other computing devices (e.g., another computing device executing a vector graphics application, not shown) via data network 214 using the network interface device 212. While network interface device 212 is illustrated connected to network 214, which is an optional part of system 200 for purposes of this disclosure, it can also connect to other networks and devices that are remote from system 200.

Staying with FIG. 2, in some embodiments, the computing device 201 also includes the presentation device 215 depicted in FIG. 2. A presentation device 215 can include any device or group of devices suitable for providing visual, auditory, or other suitable sensory output. In example embodiments, presentation device 215 displays artwork geometry, color, and color handles to a user. Non-limiting examples of the presentation device 215 include a touchscreen, a monitor, a separate mobile computing device, etc. In some aspects, the presentation device 215 can include a remote client-computing device that communicates with the system 200 using one or more data networks 214 described herein. Data network 214 can also connect computing device 201 to a network storage device 224, which can be used as a repository for stored artwork for use with the vector graphics illustration application 210, as well as updated or archived versions of the vector graphics application for distribution. Like the memory device 204, network storage device 224 can include any suitable non-transitory computer-readable medium for storing data, program code, or both.

Figure 3:
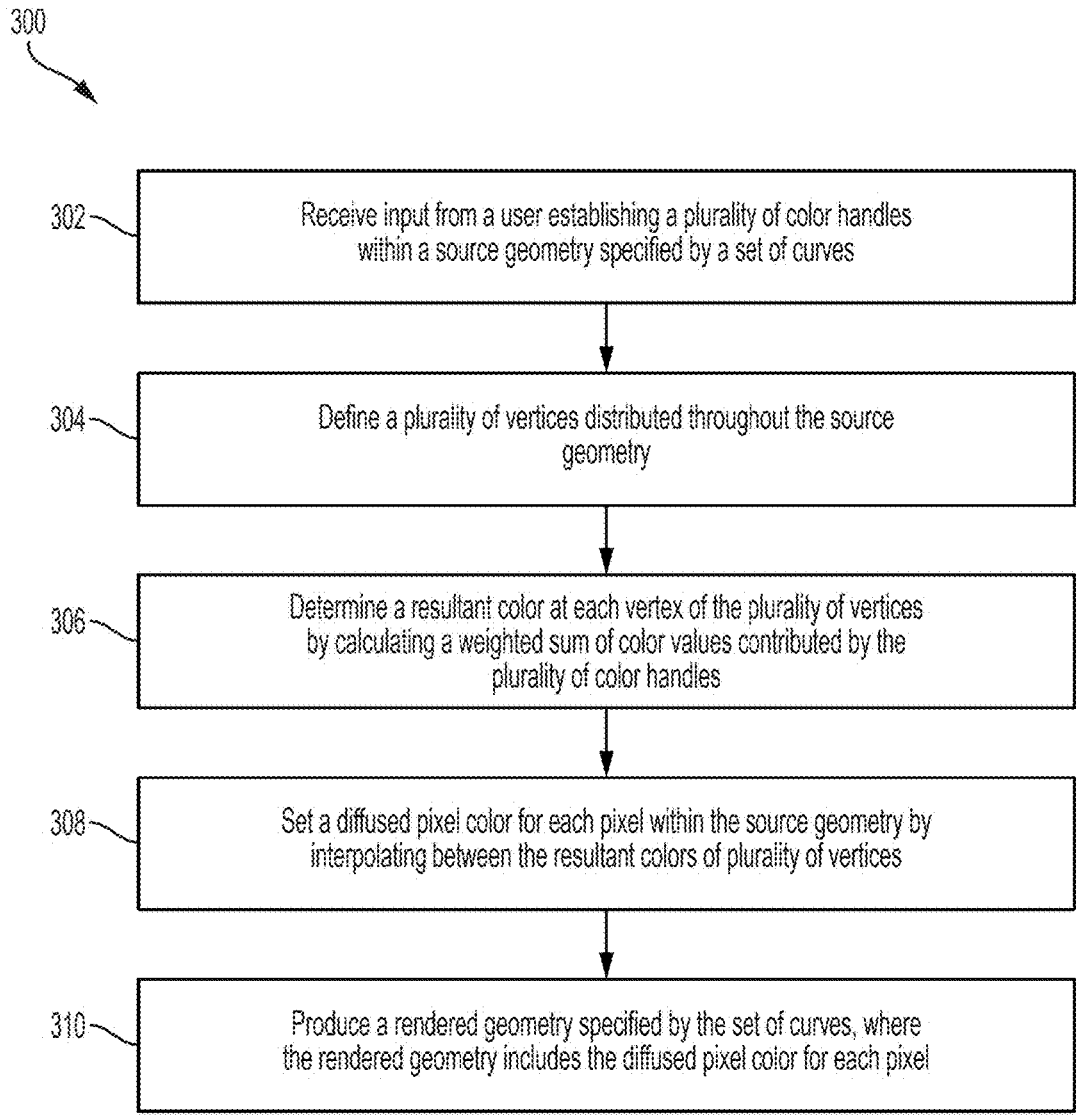
FIG. 3 is a flowchart depicting an example of a process for diffusion coloring using weighted color points, according to some embodiments.

FIG. 3 is a flowchart depicting an example of a process 300 for diffusion coloring using weighted color points with a computing device carrying out the process by executing suitable program code. At block 302, input from a user establishing a plurality of color handles within a source geometry specified by a set of curves is received, for example, through I/O interface 206. At block 304, a plurality of vertices distributed throughout the source geometry is defined by processor 202 executing vector graphics illustration application 210. At block 306, the computing device, using processor 202 executing vector graphics illustration application 210, determines a resultant color at each vertex of the plurality of vertices by calculating a weighted sum of color values contributed by the plurality of color handles. At block 308, the computing device, using processor 202 executing vector graphics illustration application 210, sets a diffused pixel color for each pixel of a plurality of pixels within the source geometry by interpolating between the resultant colors of the plurality of vertices. A rendered geometry specified by the same set of curves is produced at block 310 and displayed on presentation device 215. The rendered geometry includes the diffused pixel color for each pixel.

Figure 4:
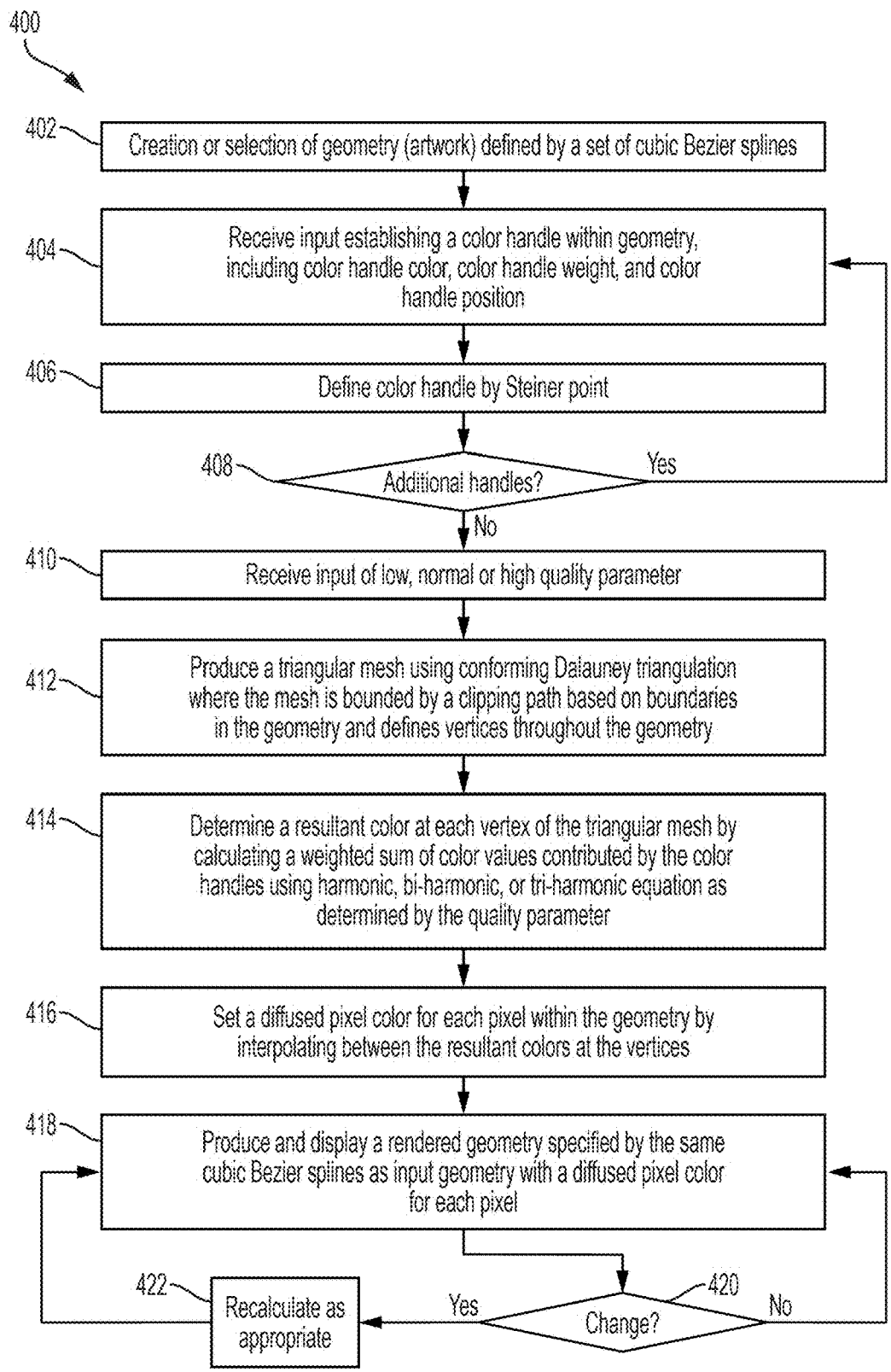
FIG. 4 is a flowchart depicting an additional example of a process for diffusion coloring using weighted color points, according to certain embodiments.

FIG. 4 is a flowchart depicting an example process 400 for diffusion coloring using weighted color points, according to certain embodiments. Blocks 402, 404, 406, and 408 illustrate an example implementation of establishing color handles as described above with reference to block 302 of FIG. 3. At block 402, the computing device 201 receives input indicating a user's creation or selection of a set of cubic Bezier splines that define the source geometry ("artwork" or "geometry") to color. At block 404, the computing device 201 receives user input establishing a color handle within the geometry. In one example, the user input involves taps or clicks anywhere inside the curve geometry to add a color handle. The user can optionally input color handle weight along with the color handle position and color handle color. At block 406, the computing device 201 creates and stores a Steiner point to serve as the color point to which the color handle is connected. At block 408, if there are additional color handles, they are inputted in the same manner as just described. The position of each of the plurality of color points is defined by a Steiner point. At block 410, the user can, optionally, at any time, define one or more quality parameters. Quality parameters will be discussed in more detail with respect to FIG. 7.

Blocks 412 and 414 of FIG. 4 illustrate an example implementation of defining vertices of a mesh and determining a resultant color at each vertex of the mesh as described above with reference to blocks 304 and 306 of FIG. 3, respectively. At block 412, the input geometry can be planarized and then an offset is applied for robustness, so that the boundary curves do not get over-flattened due to sampling. Points can then be adaptively sampled along the curve depending on the input quality parameter. Taking the Steiner points into account, a triangular mesh is produced by computing device 201 using conforming Delaunay triangulation. A clipping path identical to the original geometry is applied to bound the triangular mesh based on the boundaries in the geometry to obtain smooth edges. The triangular mesh defines vertices throughout the geometry. At block 414, a resultant color at each vertex of the triangular mesh is determined by calculating a weighted sum of color values contributed by each color point. Each color point has a corresponding weight and weights at the mesh vertices are modeled as a solution to a harmonic, bi-harmonic, or tri-harmonic equation, depending on a quality parameter. The quality parameters can also include user-defined relative intensities for each of these color handles. Once the weights are calculated for each vertex of the mesh, the final color at each mesh vertex is the linear combination of the weights (computed as a solution to the harmonic, bi-harmonic or tri-harmonic equation) with the corresponding color intensity specified for the input color handle. The color for the $j^{th}$ vertex is calculated as a weighted sum:

$$\frac{\sum_{i=1}^{n} w_{ij} c_i \mathcal{I}_i}{\sum_{i=1}^{n} w_{ij} c_i}$$

where $\mathcal{I}_i$ is the user provided intensity (default 1) of the $i^{th}$ color handle.

Staying with FIG. 4, at block 416, a diffused pixel color is set for each pixel within the geometry by interpolating between the resultant colors at the vertices, as also described with respect to block 308 of FIG. 3. A rendered geometry specified by the same cubic Bezier splines as the input geometry is produced with smooth diffused pixel colors at block 418, as also described with respect to block 310 of FIG. 3. This colored geometry can be displayed on presentation device 215 by computing device 201. If the user makes changes at block 420, color is recalculated at block 422 using all or some of the above-mentioned techniques, depending on what is changed. For example, a user can drag any existing color handle to new position within the geometry of the shape, and resultant coloring is recomputed to reflect the new position of the corresponding color point. A user can select a new color and tap or click on an existing color point to change its color. The color of color point is updated, and an updated result is presented to the user. The user can act on an existing color point to remove it, for example, by double-clicking or double-tapping. If the user edits the geometry of the cubic Bezier splines, the color is recomputed over the new geometry and presented to the user. Thus, the system can continuously handle inputs including those of color handle color, color handle weight, color handle position, or changes to any or all of these, as well as changes to the source geometry. The resultant color at each vertex is recalculated by the processor in the computing device and a diffused pixel color for each pixel is displayed.

As an example of the details behind process 400 of FIG. 4, consider the detailed example below using a bi-harmonic equation to create diffusion coloring using weighted color points. This example corresponds to what could be considered a normal or default quality parameter in some examples. $w_i$ denotes the function defining the weights of the $i^{th}$ color handle upon the entire domain ($\mathcal{D}$). The final color at any point $p \in \mathcal{D}$ is then the weighted sum of the color values $C_i$ corresponding to the $i^{th}$ color handle:

$$\sum_{i=1}^{n} C_i w_i(p) \tag{1}$$

To obtain smooth shaded images, the weight function $w_i$ corresponding to each color handle is modelled as a solution to the bi-harmonic equation:

$$\Delta^2 w_i = 0 \tag{2}$$

The above is equivalent to minimizing the Laplace energy:

$$\min_{w_i, i=1,\dots,n} \sum_{i=1}^{n} \frac{1}{2} \int_{\mathcal{D}} (\Delta w_i)^2 dA \tag{3}$$

To the above is added a set of linear constraints:

$w_i = 1$ at handle location (4)

$0 \leq w_i(p) \leq 1 \; \forall p \in \mathcal{D}$ (5)

$$\sum_{i=1}^{n} w_i(p) = 1 \quad \forall p \in \mathcal{D} \tag{6}$$

Equation 4 reflects the boundary constraints imposed upon the system. Equation 5 guarantees that the weights are positive and bounded. This ensures that the system is free from local minima everywhere except at the corresponding color points. Equation 6 ensures that every point in the domain is a "diffusion" of the colors.

To carry out the diffusion coloring procedure, the Laplacian energy (3) is discretized using the standard liner FEM Laplacian $M^{-1}L$ where M is the lumped mass matrix and L is the symmetric stiffness matrix (i.e., the cotangent Laplacian):

$$\sum_{i=1}^{n} \frac{1}{2} \int_{\mathcal{D}} (\Delta w_i)^2 dA \approx \frac{1}{2} \sum_{i=1}^{n} w_i^T (LM^{-1}L) w_i \tag{7}$$

The energy term (7) is quadratic in the unknowns $w_i$ and convex subject to linear equalities and inequalities. For the two-dimensional surface $\mathcal{D}$; L, and M have the following form when the underlying geometry is a triangular mesh:

$$L_{ij} = -\frac{1}{2}(\cot\alpha_{ij} + \cot\beta_{ij}) \tag{8}$$

$$M_{ij} = \int_{\mathcal{D}} \phi_i \phi_j dA \tag{9}$$

where $\emptyset_i$, $\emptyset_j$ are hat functions locally supported upon the triangular mesh.

Figure 5A:
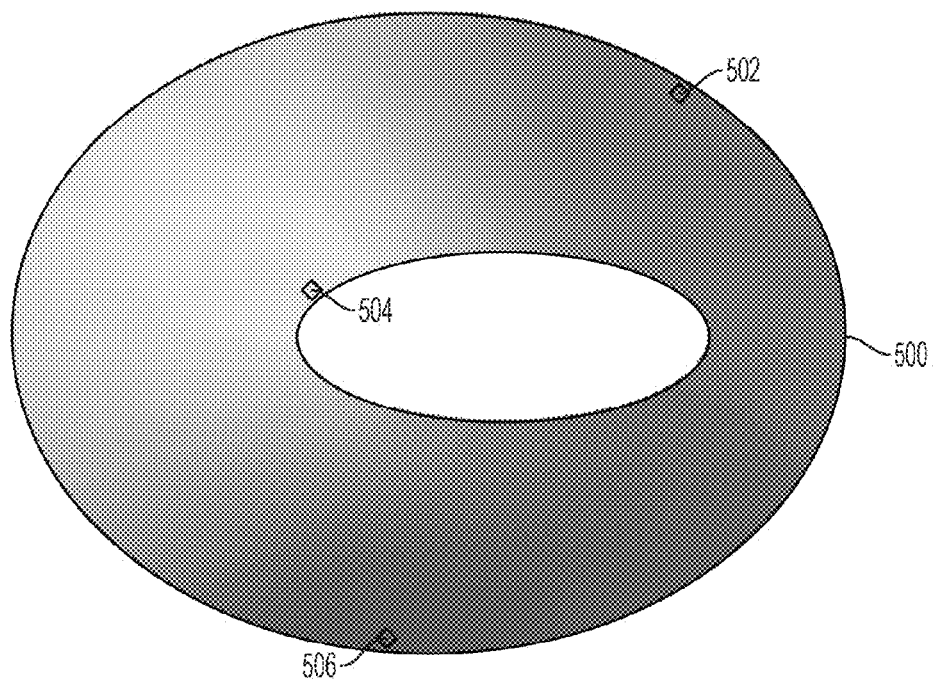
FIG. 5A and FIG. 5B depict an example of an artwork shape with color handles, diffusion coloring resulting from the color handles, within the coverage of the shape, and a mesh mathematically extending over the shape, according to some embodiments.
Figure 5B:
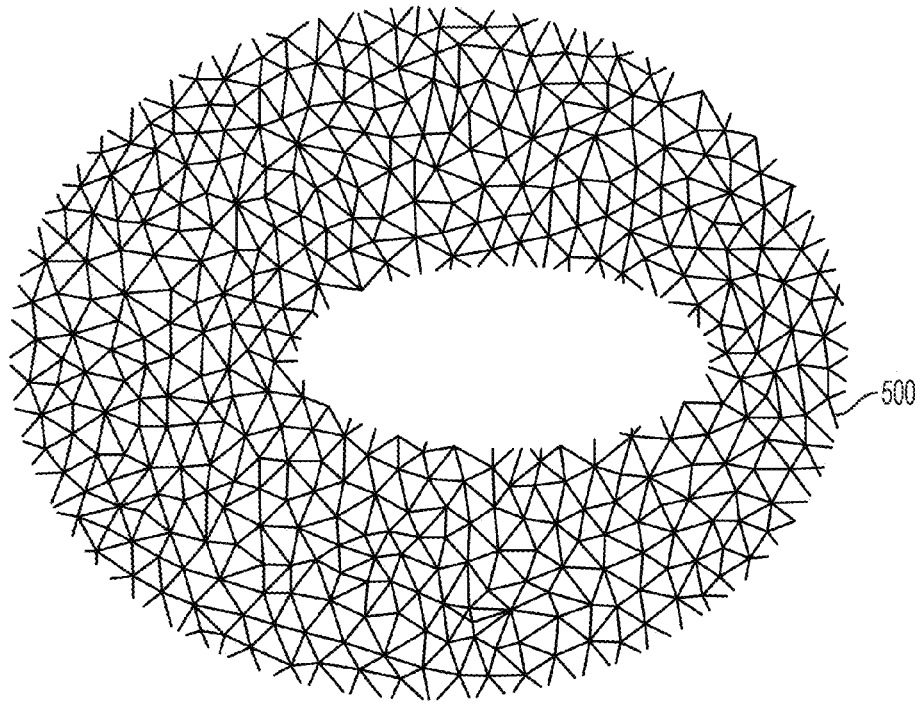

FIG. 5A and FIG. 5B illustrate views of an artwork geometry 500 that has an open space in the middle. In the view of FIG. 5A the geometry with diffusion coloring is shown as it would be to a user. In the view of FIG. 5B the corresponding, underlying triangular mesh is shown. This artwork geometry has three color handles, color handle 502, color handle 504, and color handle 506. Note that the triangular mesh demonstrates shape coverage that can accommodate artwork with holes, while at least some traditional methods of coloring vector graphics (such as lattice-based gradient mesh) do not. The triangular mesh can be represented in PDF format as type 4 shading (free-form Gouraud-shaded triangle meshes). This representation renders as a native PDF construct in applications that support PDF vector graphics and therefore supports print workflows. The resultant geometry is not a part of the source art tree but of the render art tree and therefore, all the operations listed above are non-destructive of the input geometry. The original curves selected by the user are not modified and are still available for editing as a normal Bezier splines. The user can change the geometry of the curves or may change the position of color handles resulting in the regeneration of the mesh implicitly and this regeneration is transparent to the user.

The information about the color points and their locations, 218 of FIG. 2, is stored in normalized coordinated space with respect to the selected curves. The diffusion coloring process described herein works in harmony with the traditional notion of shape coverage as specified in the PDF standard, chapter 7. As such, it leads to predictable and intuitive results; it is easy for a user to control the output as the output is intrinsically bounded by the coverage of shapes.

Figures 6A, 6B:
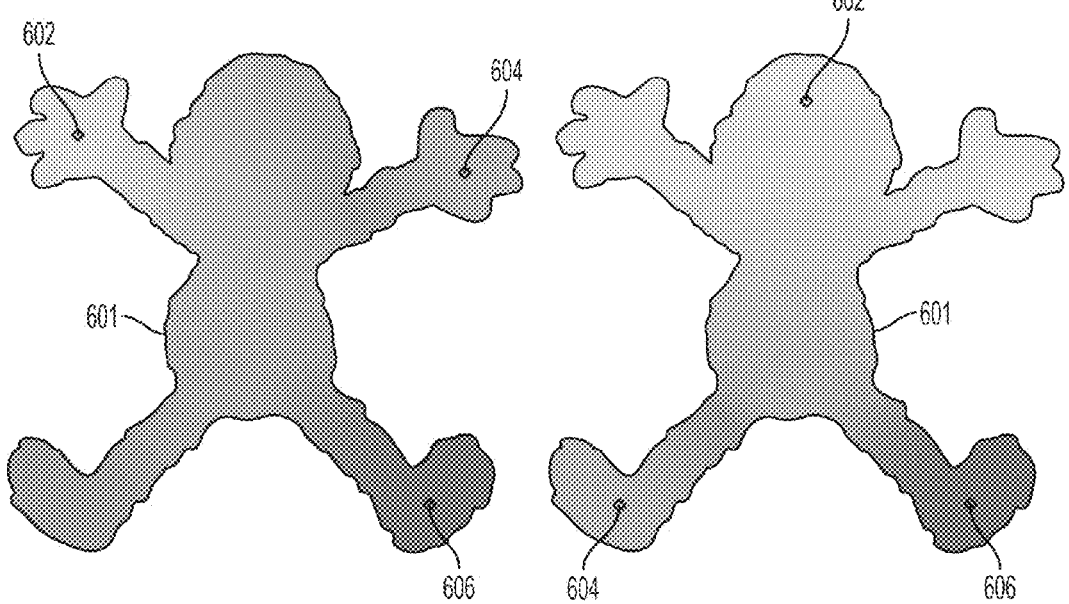
FIG. 6A, FIG. 6B, FIG. 6C, and FIG. 6D depict an example of an artwork shape with color handles and illustrates how diffusion coloring resulting from the color handles changes when the color handles are moved or deleted, according to certain embodiments.
Figures 6C, 6D:
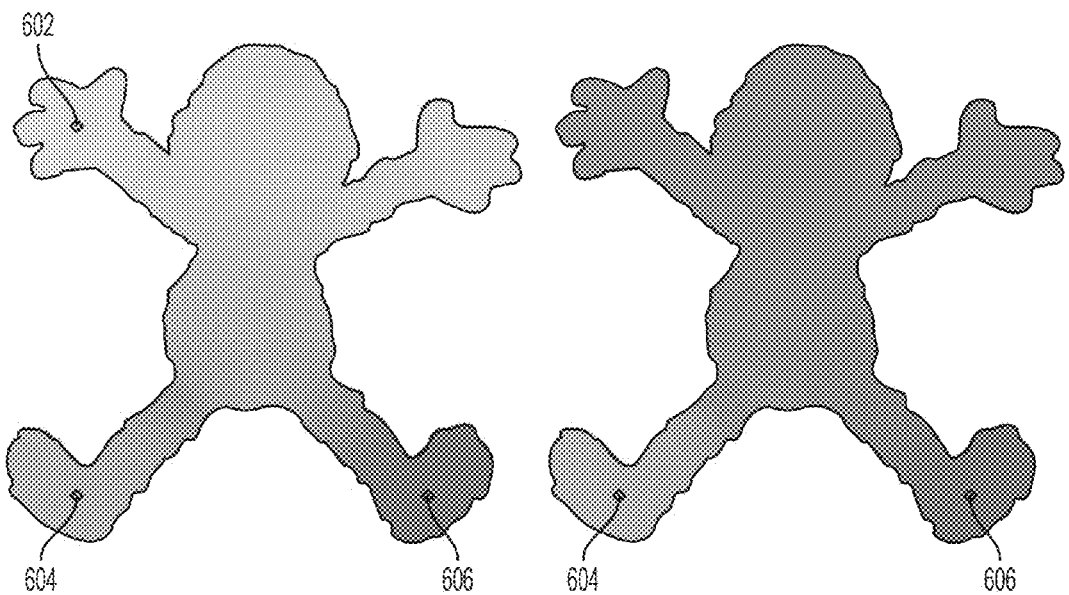

FIG. 6A, FIG. 6B, FIG. 6C, and FIG. 6D illustrate shape aware diffusion coloring according to example embodiments when color handles are changed. Beginning with the view in FIG. 6A, color handle 602, color handle 604, and color handle 606 are present. Color handle 602 has been assigned a color of yellow. Color handle 604 has been assigned a color of aqua. Color handle 606 has been assigned a color of fuchsia. Since all of the color handles are near edges of shape 601, the three colors tend to blend together towards the middle of the shape. In the view of FIG. 6B, color handle 602, the yellow color handle, has been moved towards the horizontal middle of the shape, and color handle 604 has been moved to the lower left. This change renders the upper area of shape 601 entirely yellow, since only the yellow color handle is present in the upper half of the shape. Similarly, color handle 604 now renders the left leg of shape 601 aqua. The color flow (originating from the corresponding color handle) depends on the geodesic distance among the connected components along the shape geometry. The color from the hand to the foot flows through the body as the hand and the foot are not directly connected in the shape topology. This difference can be visualized between the views of FIGS. 6A and 6C. In the view of FIG. 6A there is a prominent region of green due to the interaction between aqua and yellow color handles. The fuchsia color handle is geodesically distant from aqua and yellow color handles and thereby contributes less. In the view of FIG. 6C all three color handles; yellow, fuchsia and aqua interact (being at the same geodesic distance from the center) and hence a mix of all three colors results (instead of green which is the mix of fuchsia and aqua).

Continuing with FIGS. 6A through 6D, color handle 602 has been returned to the left arm of shape 601 in the view of FIG. 6C, rendering the top of the arm yellow. Colors from the other color handles now diffuse to the right side of the shape based on distance. In the view of FIG. 6D, color handle 602 has been removed. The entire shape is a diffusion of color handle 604 and 606 at the bottom of the shape. Thus, the color near the center of the top of the shape is a shade of purple, a substantially equal diffusion of the color fuchsia of color handle 606 and the color aqua of color handle 604.

Figure 7:
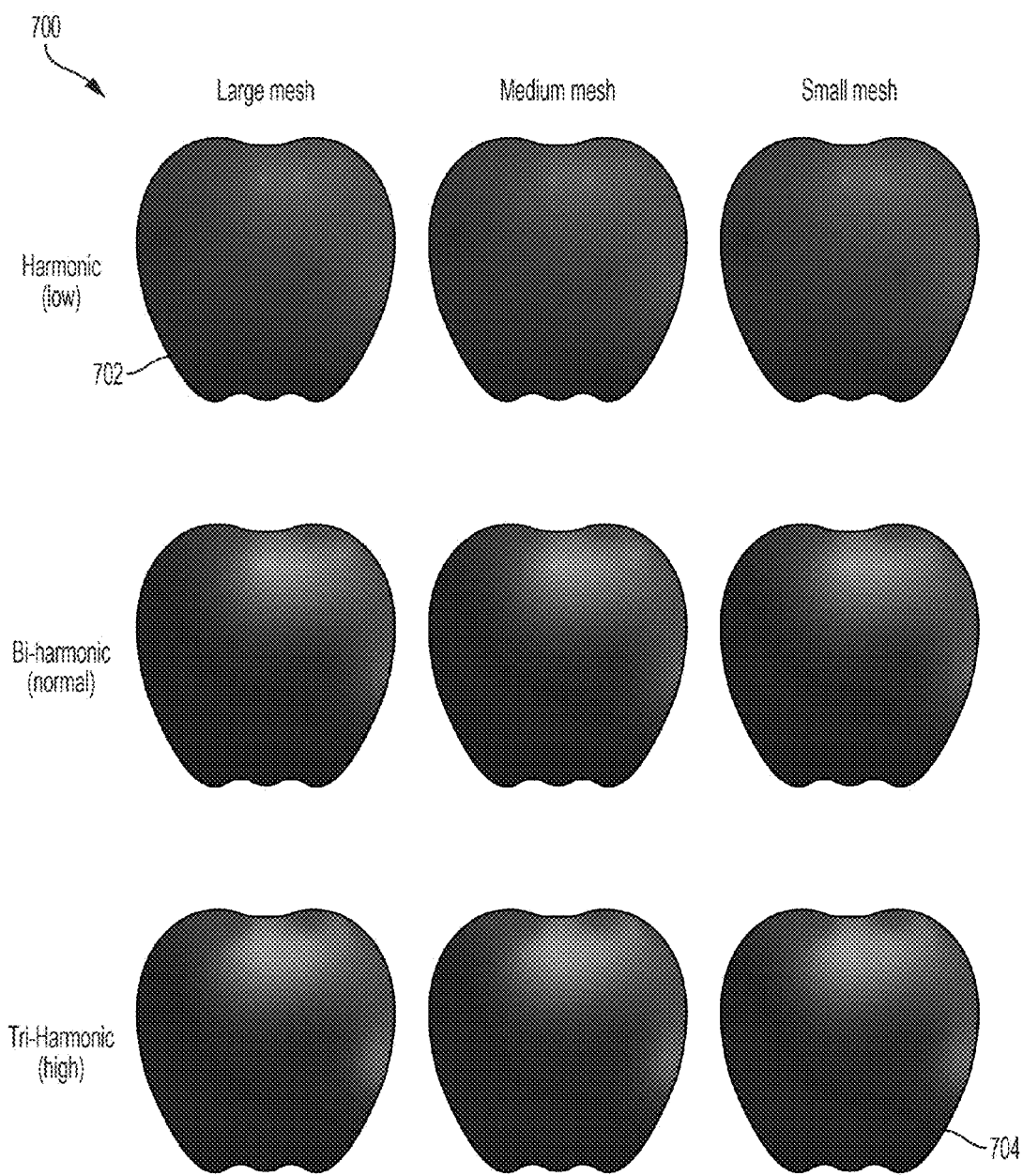
FIG. 7 depicts an example of an artwork shape and shows how diffusion coloring using weighted color points changes with differing quality parameter values according to some embodiments.

FIG. 7 shows a table 700 that illustrates the effects of changes to quality parameters. Down the left side of the table are labels for rows of the table, each row corresponding to a low, normal, or high quality parameter that in some examples can be selected by the user and changed at any time. In such examples, the weighted sum of color values is determined by a solution to a harmonic, bi-harmonic, or tri-harmonic equation as determined by this quality parameter. In these examples, a "low" value for the quality parameter corresponds to using a harmonic equation to calculate weights at mesh vertices. A "normal" value corresponds to using a bi-harmonic equation to calculate weights at mesh vertices. And a "high" value quality parameter corresponds to using a tri-harmonic equation to calculate weights at mesh vertices. A higher quality value will result in smoother renderings but will be less computationally efficient. In some examples, a user can also specify a mesh size of large, medium, or small and these options are labeled near the top of FIG. 7 and correspond to columns of table 700. A smaller mesh will result in higher quality renderings, wherein a larger mesh will result in more efficient computation. These parameter selections allow a user to seek a balance between rendering quality and computational efficiency. Version 702 of the shape would represent the lowest quality image and would result in the fastest computations as color handles are added or changes are made. Version 704 of the shape would be the highest quality and would result in the longest computation times for changes. However, the process described herein is computationally efficient in general, and even with the highest quality parameter settings, would still re-render an image perceptively fast as compared to using diffusion curves or using raster graphics when computing on the CPU. (Diffusion curves typically require high end GPUs for real time feedback.) In an example implementation with a normal quality parameter, dragging a color handle re-renders a new image continuously during the change on standard Intel®-processor based computer hardware at greater than 50 frames per second. For some specific examples based on the artwork presented in this disclosure, geometry 100 of FIG. 1 was found to take 65 ms to fully render on screen. Geometry 500 of FIG. 5 was found to take 57 ms to fully render on screen. Shape 601 of FIG. 6 with three color handles was found to take 31 ms to fully render on screen. As an extreme example, an ellipse (dimension 500×300) with 25 color handles took 215 ms to render on screen.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," "selecting," and "creating" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing device from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method comprising:
    receiving, by a computing device, input from a user adding a plurality of color handles to a source graphical image specified by a set of curves;
    establishing, by the computing device, the plurality of color handles so that each color handle is freely placeable within the source graphical image;
    defining, by the computing device, a plurality of vertices distributed throughout the source graphical image;
    determining, by the computing device, a resultant color at each vertex of the plurality of vertices by calculating a weighted sum of color values contributed by the plurality of color handles;
    setting, by the computing device, a diffused pixel color for each pixel of a plurality of pixels within the source graphical image by interpolating between the resultant colors at the plurality of vertices; and
    producing, by the computing device, a rendered geometry specified by the set of curves, the rendered geometry including the diffused pixel color for each pixel.

2. The method of claim 1 wherein the input includes at least one of a color handle color, a color handle weight, a color handle position, or a change to one or more of the foregoing.

3. The method of claim 1 wherein the input includes a quality parameter and wherein the weighted sum of color values is determined by a solution to a harmonic, bi-harmonic, or tri-harmonic equation as determined by the quality parameter.

4. The method of claim 1 wherein the plurality of vertices correspond to points in a triangular mesh, and wherein the method further comprises producing the triangular mesh by conforming Delaunay triangulation and bounded by a clipping path based on boundaries of the source graphical image.

5. The method of claim 4 wherein a position of each color handle of the plurality of color handles is defined by a Steiner point.

6. The method of claim 1 wherein the set of curves comprises cubic Bezier splines.

7. The method of claim 1 wherein the input comprises a change to the source graphical image, and wherein the method further comprises recalculating the resultant color at each vertex of the plurality of vertices and resetting a diffused pixel color for each pixel of a plurality of pixels.

8. A system comprising:
    a processor; and
    a non-transitory computer-readable medium coupled to the processor, wherein the processor is configured to execute computer program code stored in the non-transitory computer-readable medium and thereby perform operations comprising:
        receiving input from a user adding a plurality of color handles to a source graphical image specified by a set of curves;
        establishing the plurality of color handles so that each color handle is freely placeable within the source graphical image;
        defining a plurality of vertices distributed throughout the source graphical image;
        determining, by the computing device, a resultant color at each vertex of the plurality of vertices by calculating a weighted sum of color values contributed by the plurality of color handles;
        setting, by the computing device, a diffused pixel color for each pixel of a plurality of pixels within the source graphical image by interpolating between the resultant colors at the plurality of vertices; and
        producing, by the computing device, a rendered geometry specified by the set of curves, the rendered geometry including the diffused pixel color for each pixel.

9. The system of claim 8 wherein the input includes at least one of a color handle color, a color handle weight, a color handle position, or a change to one or more of the foregoing.

10. The system of claim 8 wherein the input includes a quality parameter and wherein the weighted sum of color values is determined by a solution to a harmonic, bi-harmonic, or tri-harmonic equation as determined by the quality parameter.

11. The system of claim 8 wherein the plurality of vertices correspond to points in a triangular mesh, and wherein the operations further comprise producing the triangular mesh by conforming Delaunay triangulation and bounded by a clipping path based on boundaries of the source graphical image.

12. The system of claim 11 wherein a position of each color handle of the plurality of color handles is defined by a Steiner point.

13. The system of claim 8 wherein the input comprises a change to the source graphical image, and wherein the operations further comprise recalculating the resultant color at each vertex of the plurality of vertices and resetting a diffused pixel color for each pixel of a plurality of pixels.

14. A non-transitory computer-readable medium storing program code executable by a processor to perform operations, the operations comprising:
    receiving input from a user adding a plurality of color handles to a source graphical image specified by a set of curves;
    establishing the plurality of color handles so that each color handle is freely placeable within the source graphical image;
    defining a plurality of vertices distributed throughout the source graphical image;
    determining, by the computing device, a resultant color at each vertex of the plurality of vertices by calculating a weighted sum of color values contributed by the plurality of color handles;
    setting, by the computing device, a diffused pixel color for each pixel of a plurality of pixels within the source graphical image by interpolating between the resultant colors at the plurality of vertices; and
    producing, by the computing device, a rendered geometry specified by the set of curves, the rendered geometry including the diffused pixel color for each pixel.

15. The non-transitory computer-readable medium of claim 14 wherein the input includes at least one of a color handle color, a color handle weight, a color handle position, or a change to one or more of the foregoing.

16. The non-transitory computer-readable medium of claim 14 wherein the input includes a quality parameter and wherein the weighted sum of color values is determined by a solution to a harmonic, bi-harmonic, or tri-harmonic equation as determined by the quality parameter.

17. The non-transitory computer-readable medium of claim 14 wherein the plurality of vertices correspond to points in a triangular mesh, and wherein the operations further comprise producing the triangular mesh by conforming Delaunay triangulation and bounded by a clipping path based on boundaries of the source graphical image.

18. The non-transitory computer-readable medium of claim 17 wherein a position of each color handle of the plurality of color handles is defined by a Steiner point.

19. The non-transitory computer-readable medium of claim 14 wherein the set of curves comprises cubic Bezier splines.

20. The non-transitory computer-readable medium of claim 14 wherein the input comprises a change to the source graphical image, and wherein the operations further comprise recalculating the resultant color at each vertex of the plurality of vertices and resetting a diffused pixel color for each pixel of a plurality of pixels.

* * * * *